Sept. 18, 1956 W. A. HUTCHINSON 2,763,493
UNIVERSALLY ADAPTABLE CONTROLLED STEERING
SYSTEM FOR INDUSTRIAL TRAILER TRUCKS
Filed July 26, 1954 2 Sheets-Sheet 2
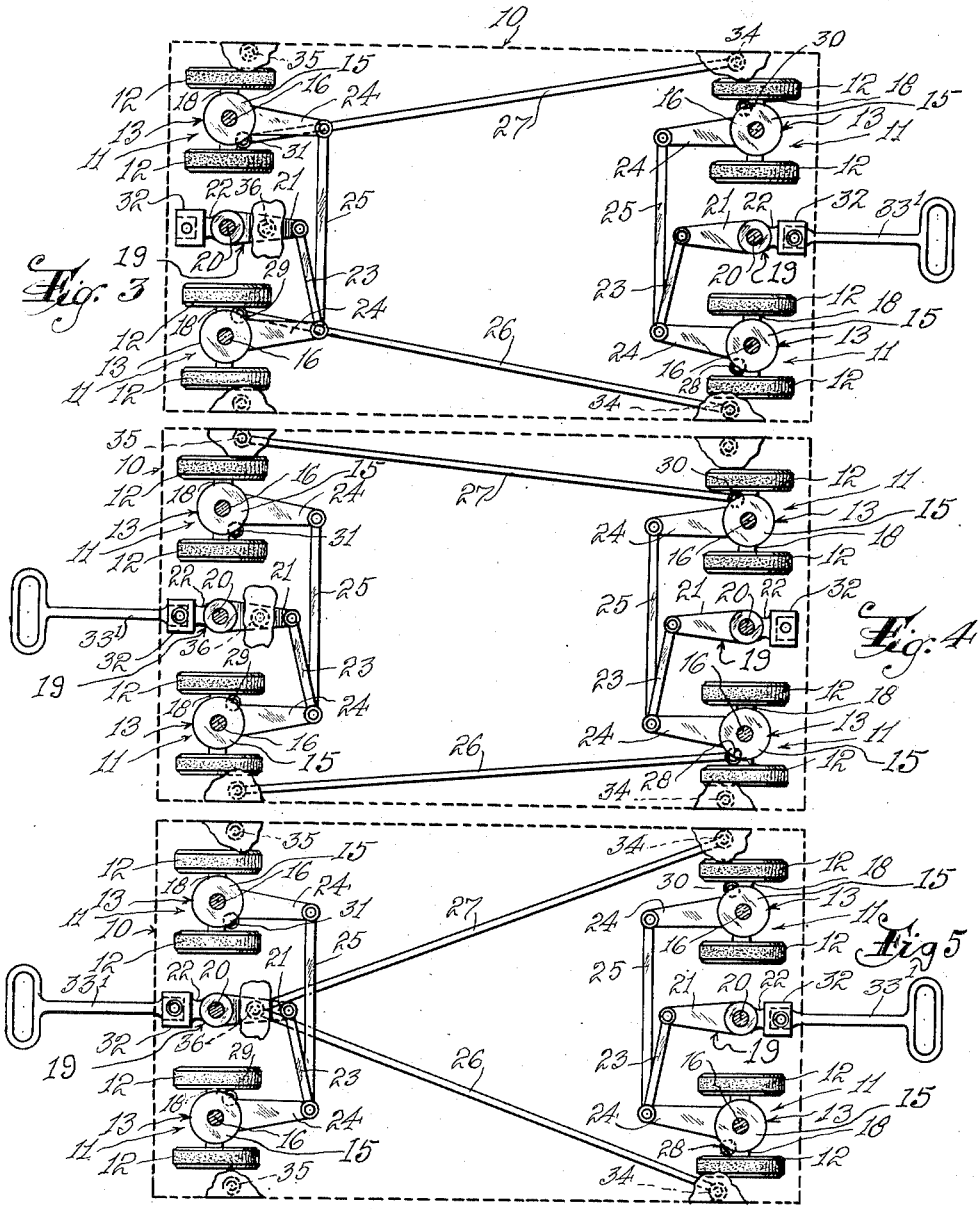
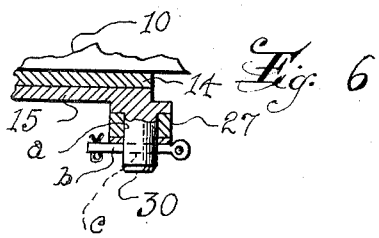
Inventor:
William A. Hutchinson
By Dudley B. Howard
Attorney.

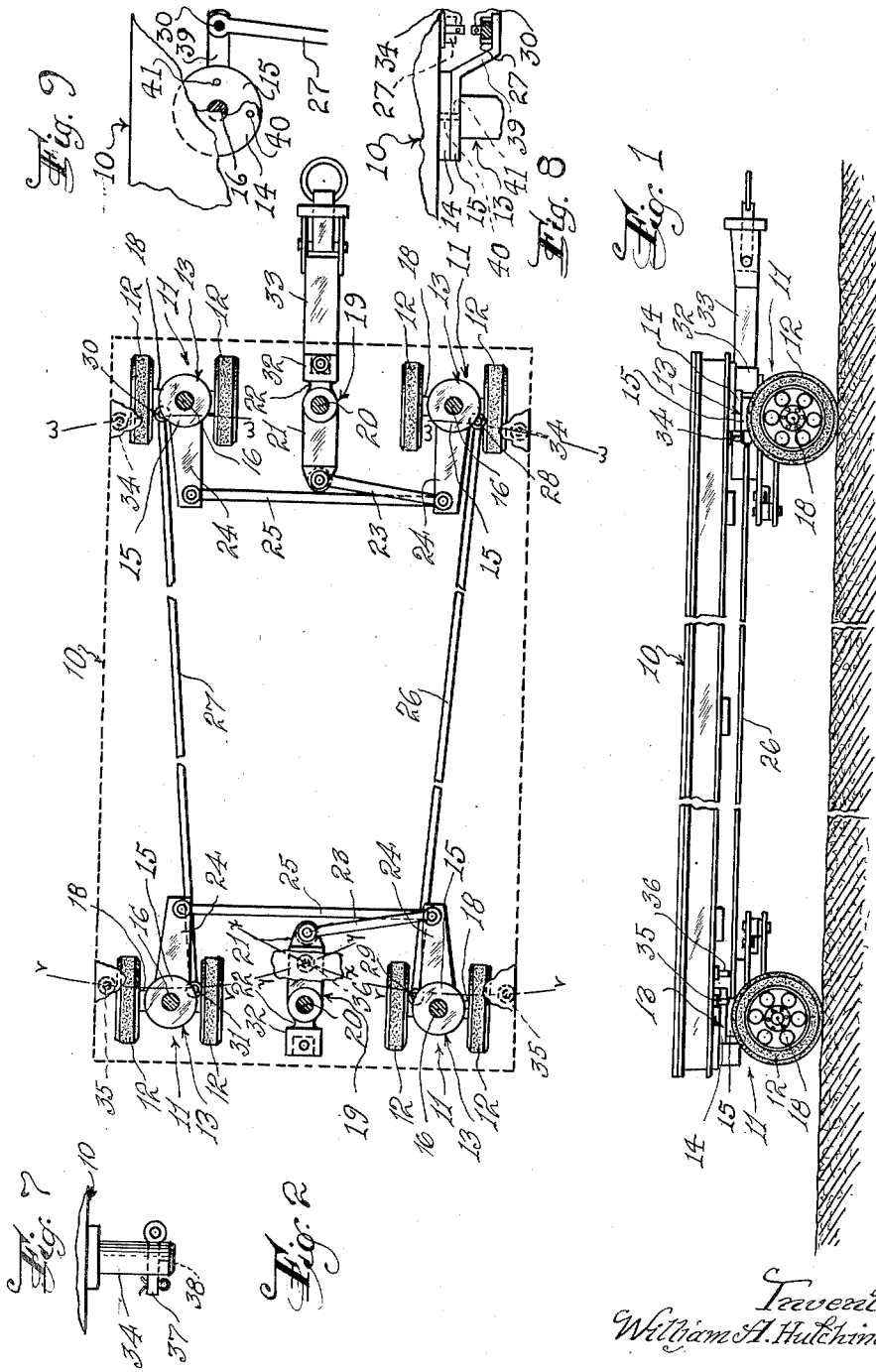

United States Patent Office 2,763,493
Patented Sept. 18, 1956

2,763,493

UNIVERSALLY ADAPTABLE CONTROLLED STEERING SYSTEM FOR INDUSTRIAL TRAILER TRUCKS

William A. Hutchinson, Little York, N. J.

Application July 26, 1954, Serial No. 445,744

8 Claims. (Cl. 280—99)

The invention relates in general to trailer trucks such as are used at industrial plants to transport finished products or their component parts and factory equipment from place to place in and about warehouses, production areas and shipping docks and platforms, and has particular reference to the controlled steering system disclosed in my prior United States Patent No. 2,676,029, dated April 20, 1954.

The steering system of my prior patent comprises pairs of side-by-side running gear units of the dual-wheel type at both ends of the vehicle, towing bars operatively connected to the respective end pairs of running gear units by suitable linkage, and reach bars interconnecting the front and rear running gear units at the right and left sides of the vehicle in a manner whereby oppositely directed turning movement on the roadway will be imparted from the running gear units at the towed end of the vehicle to those units at the opposite end. While this permanent operational arrangement satisfactorily meets nearly all situations encountered in normal use and particularly on the longer hauls, there are a few situations involved in close quarters movements that cannot be handled.

For example, it sometimes is necessary to move one end of the trailer truck in a straight course while the opposite end is steered laterally during towing or pushing. In another situation, it may be necessary to shift the position of the vehicle almost directly sideways in order to approach more closely to a wall, curb or platform under conditions which will not permit enough forward or rearward movement for normal parking procedure.

Since none of the operations just cited can be performed with my earlier steering arrangement in the form covered by the claims of my patent, it is the primary object of the present invention to provide selective means by which the running gear units at either end of the vehicle may be locked against lateral turning movement while the running gear units at the opposite end are free for lateral steering; or by which, in an alternative arrangement, both the front and rear running gear units may be released from interconnection to permit independent steering of the respective ends of the vehicle.

Another object of the invention is to provide universally adaptable steering mechanism of the kind just mentioned which is of extremely simple construction and requires only slight and inexpensive modification of the mechanism covered by my earlier patent.

Other objects, advantages and features of the invention will become apparent as the following specific description is read in connection with the accompanying drawings, in which:

Fig. 1 is a side elevation of a trailer truck having the present invention embodied in its construction, the steering mechanism being shown arranged for normal intercoupled double end steer while towing from the front end, as by use of a tractor; and Fig. 2 is a fragmentary plan view of the same showing the running gear units sectionalized on a horizontal plane coinciding with the upper faces of the lower bearing numbers thereof.

Fig. 3 is a view similar to Fig. 2, showing the steering mechanism adapted for manual front end steering and towing or pushing, with the running gear units at the rear end of the vehicle locked for straight coaxial wheel tracking; Fig. 4 is a similar view showing the arrangement reversed for manual steering and towing, or pushing, at the rear end, with the front end running gear units locked for straight tracking; and Fig. 5 is a similar view showing the front and rear running gear units released for independent manual front and rear steering and towing, or pushing.

Fig. 6 is a fragmentary detail side elevation, on an enlarged scale and partly in section, of the vehicle frame and the left front wheel holder, showing the front end of the corresponding reach bar coupled to the pivot stud thereof in the condition represented in Fig. 2; and Fig. 7 is a fragmentary side elevation of the vehicle frame, showing the reach bar anchoring stud which is located adjacent to the left front running gear unit.

Fig. 8 is a fragmentary side elevational view, partly in section, of a modified left front wheel holder with the cooperative reach bar anchoring stud located on the truck frame in depending relation thereto directly above the wheel holder in axial alignment with the pivot pin which connects the reach bar thereto in the straight-tracking arrangement of the wheel holder; and, Fig. 9 is a similar plan view of the same wheel holder under the same conditions.

Referring now in detail to the drawings, wherein like reference characters designate corresponding parts in the several views, Figs. 1 and 2 disclose a heavy duty platform trailer truck wherein the controlled steering system covered by my prior patent is supplemented by the universal adapting means of the present invention.

It should be made clear at this point that many of the structural details and the combination and arrangement of parts disclosed in the drawings and described hereinafter are subject to modification and change within the scope of the invention to meet the different practical requirements imposed by users of these trucks and to accommodate any individual model of truck to the operational conditions for which it is designed. For example, a truck which is to be used exclusively, or more frequently than not, in long hauls as a lone unit in tow behind a tractor may dispense with any steering lever, or towing bar, element at the rear end and may have a one-piece steering lever with outwardly projecting coupler device at the front end for direct connection to the tractor's drawbar. In this instance, the connecting link that would otherwise operatively connect the missing steering lever at the rear end of the truck to one of the correspondingly located wheel holder steering arms may be omitted from the rear steering gear. In the present illustrative example, however, complete steering gear has been shown at each end of the truck merely to demonstrate the manner in which this complete organization of elements may be utilized in a variety of more or less complicated situations, such as may be encountered in close quarters in a factory, to selectively lock the pair of running gear units at either end of the vehicle against lateral turning movement from straight-tracking arrangement while permitting free lateral turning of the pair of running gear units the other end, or to free the pairs of running gear units at both ends of the vehicle for independent lateral turning, due to the inclusion of the universal adapting means which constitutes my improvement over the controlled steer system disclosed in my prior patent.

As shown in the illustrative embodiment of the invention, both front corners of vehicle frame 10 are supported by widely separated side-by-side running gear units 11, each of which has dual road wheels 12—12. Each running gear unit 11 includes a typical fifth wheel consisting of an upper bearing member 14 affixed in suitable manner to frame 10 and lower bearing member 15 directly supporting said upper bearing member and connected thereto for relative rotation on a vertical axis by kingbolt 16. In the simplified form of this fifth wheel represented in the drawings, there is direct frictional contact between members 14 and 15 but it is within the scope of the invention to reduce friction by the interposition of anti-friction bearings of any suitable type (not shown). Lower bearing member 15 is fixedly mounted on a wheel holder 13 having axle means 18 for road wheels 12—12, which latter are arranged on opposite sides of the swivel axis afforded by kingbolt 16 and equidistant therefrom in order to effect equal distribution of the load on both road wheels of the set and to reduce road friction by permitting one wheel to rotate at a different speed from the other when making a turn.

When the complete front running gear constituted by the two units 11—11 is arranged for straight tracking the road wheel axles of both said units will be in substantially transverse alignment. This axle alignment is established by the draft gear for the vehicle, which includes a steering lever 19, which may be a complete towing bar (not shown) or the foreshortened lever to which a separate towing bar may be connected detachably in the manner to be described presently. Intermediate of its ends, steering lever 19 is pivotally connected to vehicle frame 10 along its center line by a vertical pivot bolt 20 that permits said steering lever to swing in a horizontal plane and serves as a fulcrum for the lever, which has inner and outer arms 21 and 22. Inner lever arm 21 is terminally connected by a link 23 to a steering arm 24 which projects rearwardly from one of the wheel holders 13, in this instance the right-hand one. A similar steering arm 24 projects rearwardly from the wheel holder 13 of the other, or left-hand, running gear unit and is terminally connected pivotally to steering arm 24 of wheel holder 13 of the right-hand running gear unit by tie rod 25. The distance between the points of pivotal connection of tie rod 25 to steering arms 24—24 may be made sufficiently shorter than the distance between kingbolts 16—16 of the front running gear units 11—11 to cause the dual road wheels of both said units to toe-out on turns in accordance with conventional practice.

The running gear units and steering gear at the rear end of the vehicle are exact structural and functional duplicates of those just described for the front end, although it is understood that steering lever 19 and connecting link 23 may be omitted under appropriate conditions of operational use for which the truck may be intended.

It being intended that the dual sets of road wheels at the end of the vehicle that may be trailing in normal road travel shall turn in a direction opposite to that assumed by those in the lead when a turn to right or to left is made, I have provided a pair of reach bars 26 and 27, respectively, which extend from front to rear between the right-hand front and rear wheel holders 13—13 and the respective left-hand front and rear wheel holders 13—13. To be more explicit, the front end of right-hand reach bar 26 is connected to the right-side or outboard segmental portion of wheel holder 13 of the right front running gear unit 11 by depending vertical-axis pivot stud stud 28, and the rear end of said reach bar is connected to the left-side or inboard segmental portion of wheel holder 13 of the right rear running gear unit 11 by depending vertical-axis pivot stud 29. Similarly, the front end of left-hand reach bar 27 is connected to the left-side or outboard segmental portion of wheel holder 13 of left front running gear unit 11 by depending vertical-axis pivot stud 30 and the rear end of said reach bar is connected to the right-side or inboard segmental portion of wheel holder 13 of the left rear running gear unit 11 by depending vertical-axis pivot stud 31.

Each of the pivot studs 28—29—30—31 is affixed to the lower bearing member 15 of the corresponding wheel holder 13 in depending relation thereto to form a journal for the bearing opening $a$ in the coupled end of the related reach bar, as shown in Fig. 6. This coupled condition of reach bar and pivot stud may be secured by suitable means, such as locking pin $b$ which is engaged in transverse hole $c$ in the stud beneath the end of the reach bar. Each pivot stud also is located at a sufficient radial distance from the swivel axis of the corresponding wheel holder to afford adequate leverage to cause all wheel holders at either end of the vehicle to be turned easily to right or left by power transmitted thereto through the medium of the reach bars by horizontal swinging movement of the steering lever 19 at the opposite end of said vehicle.

Under varying operational conditions, it may be desirable to use different types of towing bars in connection with the respective steering levers 19—19, so a socket member 32 may be provided at the free end of each outer arm 22 thereof for rigid connection thereto of either the coupler type towing bar 33 shown in Figs. 1 and 2 for normal use in attachment to a tractor or other trailer trucks of a train, or the manually operable type 33' shown in Figs. 3 to 5 for use in close quarters and unusual situations such as already have been described.

Up to this point in the present disclosure, all structural details are substantially the same as those which appear in the drawings of my prior patent and are described in the specification thereof. The structural devices which will now be described constitute my improvement on the earlier invention.

Referring now in particular to Fig. 2, it will be observed that front and rear anchoring studs 34—34 and 35—35, respectively, have been affixed to vehicle frame 10 in depending relation thereto outboard of the respective front and rear running gear units 11. The specific construction of each of these anchoring studs is identically the same as the front anchoring stud 34 illustrated in Fig. 7 and is designed to fit the bearing opening $a$ in the adjacent end of the correspondingly located reach bar 26 or 27, as the case may be, when the said end of the reach bar has been detached from the pivot stud of the wheel holder with which it is operatively associated. A similar anchoring stud 36 is located beneath frame 10 on the center line thereof adjacent to the rear running gear units 11—11. As means to secure the appropriate end of any reach bar in anchored engagement with a selected anchoring stud, each of the latter has been provided with a securing pin 37 and a diametrical hole 38 adjacent to its free end into which said pin may be removably inserted. It is to be understood that it may be practicable to utilize the securing pins $b$ that are used with pivot studs 28—29—30—31 of the wheel holders in a dual capacity to obviate additional securing pins 37.

In describing the geometrical locations of the respective anchoring studs 34—35—36 for the intended functional purposes, it will be assumed that all of the front and rear running gear units are arranged for straight tracking as represented in Fig. 2, wherein the rotational axes of the respective front and rear road wheels are in substantial transverse alignment, i. e. with the possibly included slight permanent angular variation provided for toe-out on turns. When the running gear units are thus arranged, the front anchoring stud 34 at each side of the vehicle frame is located in the arc $w$—$w$ of a circle concentric to the inboard pivot stud of the rear wheel holder on the same side of the vehicle which also intersects the axis of the outboard pivot stud of the corresponding front wheel holder. Similarly, the rear anchoring stud 35 at each side of the vehicle is located in the arc $v$—$v$ of a circle concentric to the outboard pivot stud of the front wheel holder on the same side of the vehicle which also intersects the axis of the inboard pivot stud of the corresponding rear wheel holder. The location of anchoring stud 36, however, is at the intersection of arcs $x$—$x$ and $y$—$y$ of the two circles concentric to the respective front anchoring studs 34—34.

Due to the geometrical arrangement of anchoring studs 34—35—36 just specified, it is possible to effect the alternative steering combinations illustrated in Figs. 3, 4 and 5.

For straight tracking of the rear road wheels in either forward towing or rearward pushing while steering through the front steering gear, the front ends of reach bars 26 and 27, respectively, are disengaged from the outboard pivot studs 28 and 30 of the right and left front wheel holders and are then engaged with the corresponding front anchoring studs 34—34 as shown in Fig. 3. When this has been accomplished and securing pins 37 have been applied, the rear road wheels will rotate on fixed axes but the front wheels may be steered to right or left at will by manipulation of a towing bar 33' applied to the front steering lever 19.

The operational arrangement just described may be reversed end-to-end with respect to the vehicle, as shown in Fig. 4, to permit towing or pushing and steering by a towing bar 33' applied to the rear steering lever 19. Starting from the steering arrangement depicted in Fig. 2, the rear ends of reach bars 26 and 27 are disengaged from the respective inboard pivot studs 29 and 31 of the right and left rear wheel holders and are moved laterally outward and engaged with anchoring studs 35—35.

When it is desired to free the front and rear running gear units from interconnection to permit independent steering by separate towing bars 33'—33' applied to the respective front and rear steering levers 19—19, the front ends of reach bars 26 and 27 may be engaged with the front anchoring studs 34—34 and the rear ends thereof may be overlapped and engaged with the single centrally located anchoring stud 36 in the manner represented in Fig. 5. To permit this double engagement, anchoring stud 36 should be long enough for complete penetration of the bearing openings in both reach bars. For economy of manufacture and to make them interchangeable, anchoring stud 36 and the other anchoring studs 34 and 35 may be identical in size. The particular advantage of this double-end independent steering arrangement is the ease with which the vehicle may be moved diagonally sideways into closely parked position against a curb, building, or loading platform.

By way of enumeration, the universally adaptable controlled steering system of the present invention makes possible the following useful functional arrangements: (1) single end steer—single end tow; (2) double end steer (intercoupled)—single end tow; (3) double end steer (intercoupled)—either end tow; (4) double end steer (independent)—either end or both ends tow; and (5) convertible single end steer or double end steer—tow from either end (intercoupled or independent). The versatility of the system renders a trailer truck equipped with it adaptable for use in the most complicated traffic situations that may be encountered in industrial plants, and at the same time available for normal every day uncomplicated traffic situations by using it as a conventional single-end-tow trailer. Convertibility to meet all presently conceivable conditions of use is, of course, the important feature of the improved system.

There is illustrated in Figs. 8 and 9 a modified wheel holder construction which affords a longer lever arm between each reach bar pivot stud and the swivel axis of said wheel holder and also permits location of the corresponding anchoring stud on the truck frame in a position wherein it will be directly above and in axial alignment with the pivot stud when the wheel holder is in straight-tracking position. In this instance, at least the front wheel holders may have outboard radial lever arms 39—39 rigid with lower bearing members 15 thereof. To the outer end portions of these lever arms 39—39 the respective reach bar pivot studs are affixed in upstanding positions thereabove. The left front wheel holder is represented in Figs. 8 and 9, so it is the pivot stud 30 which is shown for engagement with the front end of reach bar 27. The corresponding anchoring stud 34 is shown supported by frame 10 in depending relation thereto and in the new location just described with respect to lever arm 39 of the left front wheel holder. Consequently, when it is desired to lock the rear wheel holders against lateral turning movement, all that is necessary is to hold the front wheel holders in straight-tracking position, release the front ends of reach bars 26 and 27 from pivot studs 28 and 30, and then shift said ends of the reach bars straight upward into secured engagement with superimposed anchoring studs 34—34, respectively.

While it is practicable to mount the respective inboard pivot studs 29 and 31 of the rear wheel holders on radial lever arms 39—39, lack of sufficient clearance with respect to the steering gear makes it undesirable to locate the rear anchoring studs 35—35 in the same positions relative to the rear wheel holders as may be done so advantageously at the front end of the truck (Figs. 8 and 9). Instead, it is preferred to locate studs 35—35 elsewhere along arcs v—v than in positions to align with pivot studs 29 and 31 when the rear wheel holders are in their straight-tracking arrangement. Actually, positions inboard of the said rear wheel holders have been found to be more desirable than the outboard locations shown in Figs. 2 to 5 of the drawings when the front anchoring studs 34—34 are in their newly located positions (Figs. 8 and 9).

Obviously, when it is desired to disconnect reach bars 26 and 27 from both the front and the rear wheel holders, their front ends may be engaged with the newly located front anchoring studs 34—34, whereupon it will be found that their rear ends will precisely reach the rear anchoring studs 35—35 regardless of the locations which may be chosen for them provided that they are somewhere on arcs v—v, thereby eliminating the use of the common centrally located anchoring stud 36.

It has been explained that the truck can be moved almost directly sideward when both reach bars 26 and 27 have been disconnected from the respective pivot studs of the front and rear wheel holders 13. Provision has also been made for precisely direct sideward movement, i. e. at right angles to the longitudinal axis of vehicle frame 10, under those unusual conditions wherein that direction of movement is necessary, by providing vertical pin holes 40 and 41, respectively, in the upper and lower bearing members 14 and 15 of each wheel holder 13. Both holes 40 and 41 are equidistant from the swivel axis of the wheel holder but hole 40 is arranged at 90 degrees from hole 41 when the wheel holder is in straight tracking position as shown in Figs. 8 and 9. Whenever it is desired to move the truck directly sideward, in addition to the release of reach bars 26 and 27 from normal engagement with wheel holders 13 (Fig. 2), any tie rod 25 which may be in use with the steering gear is disconnected and all wheel holders are turned on their swivel axes through an angle of 90 degrees in the proper direction to bring pin hole 40 of each wheel holder into registration with the mated pin hole 41 thereof. Thereupon, locking pins of convenient size and type (not shown) may be inserted in the registering pin holes 40 and 41 of the respective wheel holders 13 to lock the latter in position with their wheel rotational axes parallel to the longitudinal axis of the vehicle frame. Now, lateral pressure or traction exerted upon the truck either manually or by power means will cause it to move straight to the side in the desired direction.

It will be understood that it is intended to cover all changes and modifications of the example of the invention herein chosen for the purpose of illustration which do not constitute departures from the spirit and scope of the invention.

Having thus described the invention, I claim:

1. A universally adaptable controlled steering system for industrial trailer trucks comprising, in combination: a vehicle frame having front and rear ends; running gear to support the respective ends of said frame, said running gear at each end consisting of a pair of widely spaced units and each said unit including a wheel holder swiveled to the frame on a vertical axis and at least one road wheel journaled in the wheel holder to support the same; a horizontally swingable steering lever located at at least one end of the vehicle and being pivotally connected thereto; connecting means operatively interposed between said steering lever and the respective wheel holders of the corresponding running gear units in a manner to swivel said wheel holders simultaneously from side to side in coordination with swinging movement of said steering lever; a reach bar extending between the front and rear wheel holders on at least one side of the vehicle; means to detachably connect one end of said reach bar pivotally to a side portion of a front wheel holder and the other end thereof to a side portion of a rear wheel holder in such a manner that swiveling of either wheel holder in any direction will cause the other wheel holder to swivel oppositely; an anchoring device located on the vehicle frame laterally adjacent to each reach-bar-connected wheel holder at a point lying in the arc of a circle equal in radius to the length of each reach bar and concentric to the pivotal axis of the reach bar connecting means on the other interconnected wheel holder when the running gear units at both ends of the vehicle are arranged for straight tracking with the respective road wheels thereof in substantially axial alignment, said arc of a circle also intersecting the pivotal axis of the reach bar connecting means at the wheel holder corresponding in position to said anchoring device; each anchoring device being capable of detachable anchoring engagement with the corresponding end of the reach bar when released from engagement with the pivotal connecting means of the corresponding wheel holder.

2. A universally adaptable controlled steering system for industrial trailer trucks as defined in claim 1, wherein there are two reach bars of which each has its opposite ends pivotally connected detachably to the respective outboard and inboard portions of the wheel holders at one side of the vehicle, and wherein a single anchoring device similar to the said other anchoring devices is located in a point on the vehicle frame lying at the intersection of arcs of circles equal in radius to the length of each reach bar and concentric to the respective anchoring devices located adjacent to the wheel holders at one end of the vehicle.

3. A universally adaptable controlled steering system for industrial trailer trucks as defined in claim 2, wherein the reach bar pivotal means on each wheel holder and each anchoring device on the vehicle frame is in the form of a vertical stud; wherein each end of each reach bar has a vertical bearing opening for alternate engagement with the correspondingly located wheel holder pivot stud and frame anchoring stud; and wherein means is included to secure the engaged end of each reach bar detachably in engagement with a selected stud.

4. A universally adaptable controlled steering system for industrial trailer trucks as defined in claim 1, wherein the reach bar pivotal means on any wheel holder and each anchoring device on the vehicle frame is in the form of a vertical stud; wherein each end of each reach bar has a vertical bearing opening for alternate engagement with the correspondingly located wheel holder pivot stud and frame anchoring stud; and wherein means is included to secure the engaged end of each reach bar detachably in engagement with a selected stud.

5. A universally adaptable controlled steering system for industrial trailer trucks comprising, in combination: a vehicle frame having front and rear ends; running gear to support the respective ends of said frame, said running gear at each end consisting of a pair of widely spaced units and each said unit including a wheel holder swiveled to the frame on a vertical axis and at least one road wheel journaled in the wheel holder to support the same; a horizontally swingable steering lever located at each end of the vehicle and being pivotally connected thereto; connecting means operatively interposed between each steering lever and the respective wheel holders of the corresponding running gear units in a manner to swivel said wheel holders simultaneously from side to side in coordination with swinging movement of said steering lever; a reach bar extending between the front and rear wheel holders on each side of the vehicle; means to detachably connect one end of each reach bar pivotally to the inboard side portion of the adjacent wheel holder and the other end thereof to the outboard side of the other wheel holder on the same side of the vehicle; and anchoring means provided on the vehicle frame to detachably engage the reach bars in a manner to immobilize any of the wheel holders connected thereto against lateral turning movement.

6. A universally adaptable controlled steering system for industrial trailer trucks as defined in claim 1, wherein each end of the reach bar has a vertical bearing opening, wherein the means pivotally connecting each end of the reach bar to a corresponding wheel holder is in the form of a vertical pivot stud projecting upward from said wheel holder, wherein the anchoring device for each end of the reach bar is in the form of a vertical stud located on the vehicle frame in depending relation thereto and in a position wherein it will be in vertical alignment with the pivot stud of the corresponding wheel holder when the latter is in straight-tracking position.

7. A universally adaptable controlled steering system for industrial trailer trucks as defined in claim 1, wherein locking means is provided in cooperation with the wheel holder anchoring means to lock each wheel holder against swiveling movement when the corresponding reach bar has been disconnected therefrom and said wheel holder has been disconnected from the other wheel holder at the same end of the vehicle and has been turned through 90 degrees from straight-tracking position to permit direct sideward movement of the truck.

8. A universally adaptable controlled steering system for industrial trailer trucks as defined in claim 7, wherein each wheel holder includes an upper bearing member affixed to the vehicle frame and a lower bearing member swiveled with respect to said upper bearing member on a vertical axis, and wherein the means to lock each wheel holder against swivelling movement includes a locking pin detachably engageable with registering holes in the upper and lower bearing members thereof.

References Cited in the file of this patent

UNITED STATES PATENTS

| | | |
|---|---|---|
| 1,242,223 | Mueller | Oct. 9, 1917 |
| 1,312,788 | Keller | Aug. 12, 1919 |
| 1,380,119 | Sponsel | May 31, 1921 |
| 2,029,540 | Porteous | Feb. 4, 1936 |
| 2,189,453 | Struensee | Feb. 6, 1940 |
| 2,676,029 | Hutchinson | Apr. 20, 1954 |

FOREIGN PATENTS

| | | |
|---|---|---|
| 124,929 | Great Britain | Apr. 10, 1919 |